United States Patent
Taketani et al.

(10) Patent No.: US 7,125,764 B2
(45) Date of Patent: Oct. 24, 2006

(54) METHOD OF PRODUCING SOLID ELECTROLYTIC CAPACITOR

(75) Inventors: Yutaka Taketani, Daito (JP); Yoshiaki Hasaba, Shijyonawate (JP); Makoto Sakamaki, Daito (JP); Tadahito Ito, Katano (JP)

(73) Assignees: Sanyo Electric Co., Ltd., Osaka (JP); Sun Electronic Industries Corp., Osaka (JP)

( * ) Notice: Subject to any disclaimer, the term of this patent is extended or adjusted under 35 U.S.C. 154(b) by 74 days.

(21) Appl. No.: 10/487,072

(22) PCT Filed: Aug. 12, 2002

(86) PCT No.: PCT/JP02/08231

§ 371 (c)(1),
(2), (4) Date: Sep. 13, 2004

(87) PCT Pub. No.: WO03/017299

PCT Pub. Date: Feb. 27, 2003

(65) Prior Publication Data

US 2005/0030678 A1 Feb. 10, 2005

(30) Foreign Application Priority Data

Aug. 20, 2001 (JP) ............................. 2001-249210

(51) Int. Cl.
*H01L 21/8249* (2006.01)

(52) U.S. Cl. ...................... 438/239; 438/240; 361/525; 361/523

(58) Field of Classification Search ................. 438/239
See application file for complete search history.

(56) References Cited

U.S. PATENT DOCUMENTS

| | | | |
|---|---|---|---|
| 4,696,835 A * | 9/1987 | Maus et al. .................. | 427/121 |
| 5,017,272 A * | 5/1991 | Kamigawa ................... | 205/108 |
| 6,515,848 B1 * | 2/2003 | Yoshida et al. .............. | 361/525 |

FOREIGN PATENT DOCUMENTS

JP 3-6217 A 1/1991

* cited by examiner

*Primary Examiner*—Michael Lebentritt
*Assistant Examiner*—Kyoung Lee
(74) *Attorney, Agent, or Firm*—Nixon & Vanderhye P.C.

(57) ABSTRACT

A manufacturing method according to the present invention of a solid electrolytic capacitor includes: a step of immersing a anode body on which the dielectrics film layer is formed in a solution that includes from 0.7 to 10% by weight of hydrogen peroxide, from 0.3 to 3% by weight of sulfuric acid and water as a main solvent, followed by, after pulling up, exposing to vapor of pyrrole or a pyrrole derivative, and thereby forming, on the dielectrics film layer, a first conductive polymer layer made of polypyrrole or a polypyrrole derivative; and a step of immersing the anode body on which the dielectrics film layer and the first conductive polymer layer are formed in a solution that includes a polymerizing monomer and a supporting electrolyte to electrolytically polymerize the polymerizing monomer, and thereby forming a second conductive polymer layer on the first conductive polymer layer.

5 Claims, 2 Drawing Sheets

METHOD OF PRODUCING SOLID ELECTROLYTIC CAPACITOR

This application is the U.S. national phase of international application PCT/JP02/08231 filed 14 Aug. 2002, which designated the U.S. PCT/JP2/08231 claims priority to JP Application No. 2001-249210 filed 20 Aug. 2001. The entire contents of these applications are incorporated herein by reference.

TECHNICAL FIELD

The present invention relates to a solid electrolytic capacitor that employs niobium or an alloy mainly made of niobium as a anode material and a conductive polymer as a cathode material.

BACKGROUND ART

As a anode body of an electrolytic capacitor, a wound body of surface-roughened aluminum foil, a single layer body or multi-layered body of surface-roughened aluminum thin plate, a porous sintered body of tantalum powder and so on are much used.

As a material of the anode body, niobium is also gathering attention.

Niobium that, similarly to tantalum, belongs to 5A group in the periodic table is a metal close in the physical properties to tantalum and has various advantages such as, in comparison with tantalum, the specific gravity being smaller, the reserves being more abundant, the price per kg being less expensive and so on. Accordingly, various attempts have been carried out to utilize niobium as the anode material. However, there are many problems in that in an electrolytic capacitor that uses niobium as the anode material, the leakage current is likely to increase, the aging treatment (an operation to make defect portions of a dielectrics film insulative by applying a direct current voltage in accordance with the polarity of the capacitor for a long period of time) to reduce the leakage current is difficult to demonstrate desired effects, a value of electrostatic capacitance is likely to fluctuate according to a direct current bias voltage and so on. These problems cannot be overcome by simply applying the technologies that are used in the tantalum anode body. As far as the present inventors know, the niobium anode body is not yet commercialized.

On the other hand, as a cathode material of an electrolytic capacitor, in place of a conventional electrolyte solution, a solid electrolyte such as a conductive oxide such as manganese dioxide and so on, and an organic semiconductor such as TCNQ complex and so on has become to be frequently used. Furthermore, recently, conductive polymers such as polypyrrole, poly-thiophene and so on have been also put into practical use. Anyhow, the anode material is limited only to aluminum or tantalum.

As means for forming the conductive polymer layer as the cathode material with a certain degree of thickness, (1) a method of repeating chemical polymerization several times, (2) a method of forming, on a thin conductive polymer layer formed by a chemical polymerization process, by means of electrolytic polymerization, a relatively thick conductive polymer layer (JP-B-04-74853) and so on are known.

Here, the chemical polymerization means to oxidation-polymerize a polymerizing monomer without using energizing means but using an action of an oxidant. The electrolytic polymerization means to oxidation-polymerize a polymerizing monomar by use of the energizing means.

The methods of forming a conductive polymer layer according to the (1) and (2), respectively, have merits and demerits depending on combinations of materials of anode body and constitutions thereof and so on. However, when taking the easiness in forming a dense conductive polymer layer, the easiness of controlling a polymerization reaction, the long pot-life of a polymerization solution and so on into consideration, the later (2) (a method that uses the chemical polymerization and the electrolytic polymerization in combination) is more advantageous.

In recent years, technology as to niobium powder for capacitors has demonstrated dramatic improvements. That is, the CV product (a product of electrostatic capacitance C per unit mass obtained by forming a dielectrics film and chemical conversion (anodic oxidation) voltage V for forming the dielectrics film) was improved and proved to be hardly different from that of the tantalum powder; and, the purity of the niobium powder was remarkably improved such as that an absorbed oxygen concentration was reduced from the conventional several tens thousands ppm to several thousands ppm and so on.

In this connection, researches toward the practical applications of niobium electrolytic capacitors are in boom. In particular, since niobium hates high temperatures, combinations with conductive polymer cathodes that allow forming by processing and operating at relatively low temperatures are targets of flourishing researches because these are considered the most shortest crosscut.

However, as the researches of the niobium electrolytic capacitors progress as mentioned above, the differences from the case where the tantalum anode body is used are gradually revealed, and it has become obvious that simple transfer of the conventional technology of the tantalum electrolytic capacitors is far from manufacturing practically applicable ones.

Problems that the present invention is to solve are cited as follows.

Firstly, when a dielectrics film layer and a conductive polymer cathode layer are formed on a surface of a anode element that is made of a niobium sintered body, even when the conditions the same as that in the case where a tantalum sintered element is used are applied to form the respective layers, the leakage current becomes very large, that is, an almost short-circuited state is caused, resulting in being incapable of, in many cases, carrying out the aging treatment.

Furthermore, granted that dielectrics film layer formation conditions and conductive polymer layer formation conditions that allow applying the aging to some extent are found, the electrostatic capacitance occurrence rate (a ratio of the electrostatic capacitance measured after the formation of the conductive polymer layer to that measured in a conductive aqueous solution before the formation of the conductive polymer layer) is low. That is, different from the case where the tantalum sintered body is used, it is very difficult to form the conductive polymer layer to a center portion of the niobium sintered body.

As to the capacitance occurrence rate, in the case of the tantalum sintered body being used, whether the conductive polymer layer is formed according to the chemical polymerization method or to a method that combines the electrolytic polymerization method therewith, substantially 85% or so can be relatively easily achieved. On the other hand, in the case where the niobium sintered body is used, it is not easy to conquer a wall of from 20 to 30%.

DISCLOSURE OF INVENTION

The present invention provides a niobium anode/conductive polymer cathode capacitor that is high in the capacitance occurrence rate and can sufficiently reduce the leakage current owing to the aging.

A manufacturing method according to the present invention of a solid electrolytic capacitor, in a method of manufacturing a solid electrolytic capacitor in which on a surface of a anode body that is made of niobium or an alloy primarily made of niobium, a dielectrics film layer, a first conductive polymer layer and a second conductive polymer layer are sequentially formed, including:

a step of forming, on the dielectrics film layer, a first conductive polymer layer (chemically polymerized conductive polymer layer) including polypyrrole or a polypyrrole derivative by immersing a anode body on which the dielectrics film layer is formed in a solution (a solution of an oxidizing agent) that includes from 0.7 to 10% by weight of hydrogen peroxide (more preferably from 2 to 7% by weight), from 0.3 to 3% by weight of sulfuric acid (more preferably from 0.5 to 2% by weight) and water as a main solvent, followed by, after pulling up, exposing to vapor of pyrrole or a pyrrole derivative; and a step of forming a second conductive polymer layer (electrolytically polymerized conductive polymer layer) on the first conductive polymer layer by immersing the anode body on which the dielectrics film layer and the first conductive polymer layer are formed in a solution (electrolytically polymerizing solution) that includes a polymerizing monomer and a supporting electrolyte, followed by energizing the solution to electrolytically polymerize the polymerizing monomer.

According to the manufacturing method according to the invention, an excellent quality conductive polymer layer can be assuredly formed to a center portion of a niobium anode body on which a dielectrics film layer is formed; accordingly, a solid electrolytic capacitor in which the capacitance occurrence rate is high and the leakage current can be sufficiently reduced by means of the aging can be provided.

In the case of a niobium sintered element being used as the anode body, so far it was very difficult to form the chemically polymerized conductive polymer layer to the center portion of the element; furthermore, even when the electrolytically polymerized conductive polymer layer is formed thereon, the electrolytically polymerized conductive polymer layer cannot be formed to the center portion of the element. Accordingly, the capacitance occurrence rate as a capacitor is low and the aging is applied with difficulty. However, according to the invention, the chemically polymerized conductive polymer layer can be formed sufficiently to the center portion of the element. As a result, the electrolytically polymerized conductive polymer layer that is formed thereon, even when a range of condition selection concerning materials and formation methods is expanded, can be formed sufficiently to the center portion of the element.

That is, as materials of the second conductive polymer layer in the invention, other than polypyrrole, polythiophene, polyaniline or polymers of derivatives thereof can be adopted. Furthermore, even as to the supporting electrolytes that are added to the electrolytic polymerization solution, various kinds of supporting electrolytes that are used in combination with the tantalum sintered element can be adopted.

To the solution of oxidizing agent that is used in the step of forming the first conductive polymer layer, in order to lower the surface tension of the solution, a water-soluble organic solvent such as alcohols and so on may be added.

Furthermore, in the case of a concentration of the solution of oxidizing agent that is used in the step of forming the first conductive polymer layer being low to a certain extent, by repeating the step several times, the chemically polymerized conductive polymer layer becomes to be sufficiently formed to a more center portion of the element.

BEST MODE FOR CARRYING OUT THE INVENTION

Figure 1:
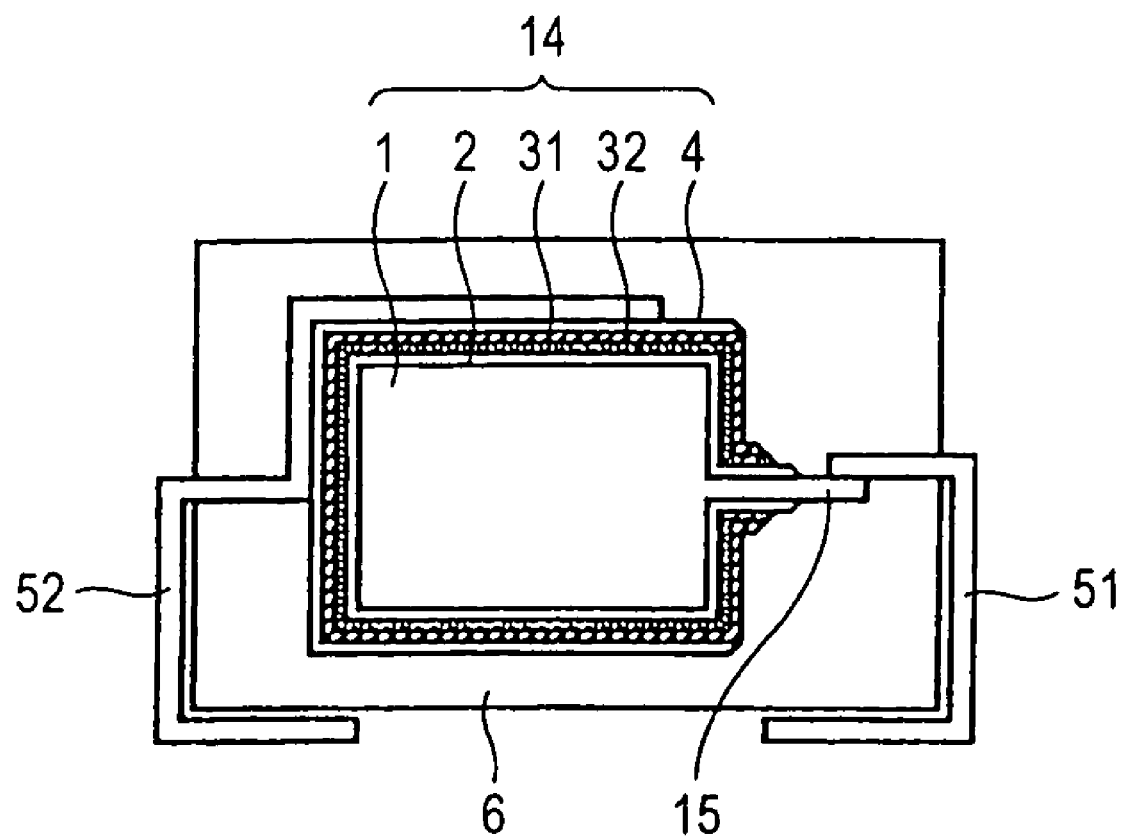
FIG. 1 is a sectional view of a solid electrolytic capacitor.

A solid electrolytic capacitor corresponding to one embodiment according to the present invention, as shown in FIG. 1, is one that is obtained by sequentially forming on a surface of a anode body 1 made of niobium (or an alloy mainly made of niobium), a dielectrics film layer 2 made of an oxide of niobium, a first conductive polymer layer 31 obtained by chemically polymerizing pyrrole (or a derivative of pyrrole), a second conductive polymer layer 32 obtained by electrolytically polymerizing a polymerizing monomer such as pyrrole, thiophene, aniline or a derivative thereof and a cathode drawing out layer 4 made of a conductive carbon layer and a silver paste layer to form a capacitor element 14, by welding a anode lead terminal 51 to a anode lead wire 15 embedded at one end of the anode body 1, by brazing a cathode lead terminal 52 to the cathode drawing-out layer 4, and by covering and hermetically sealing an external periphery of the capacitor element 14 with an encapsulating layer 6 made of an epoxy resin.

The dielectrics film layer can be formed by immersing the anode body in a chemical conversion treatment solution such an aqueous solution of phosphoric acid, an aqueous solution of nitric acid, an aqueous solution of sulfuric acid, an aqueous solution of ammonium adipate and so on to apply chemical conversion treatment (anodic oxidation).

At this time, in the case of a niobium system anode body being used, when a temperature of the chemical conversion liquid is set at substantially 40 degree centigrade or less, more preferably at 25 degree centigrade or less, a more dense and stable amorphous oxide film can be grown, resulting in improving in the electric characteristics as a capacitor (for instance, the electrostatic capacitance variation due to thermal load and bias voltage dependency of the electrostatic capacitance).

In the following, while paying attentions to combinations of the anode materials and the formation methods of the first and second conductive polymer layers, embodiments, comparative embodiments and reference embodiments will be cited.

[Embodiment 1]

A porous anode element obtained by sintering 52 mg of niobium powder of which the CV product is 80000 μFV/g and an embedded niobium wire was subjected to the chemical conversion treatment in an aqueous solution of phosphoric acid at 5 degree centigrade and 38 V to form a dielectrics film layer made of an oxide of niobium. The electrostatic capacitance (electrostatic capacitance in water) of the element immersed in an aqueous solution of 8-N sulfuric acid was 112 μF.

In the next place, the element was immersed in a solution (a solution of an oxidizing agent) in which in a mixed solvent of water: methanol=9:1 (by weight ratio) 5% by weight of hydrogen peroxide and 1% by weight of sulfuric acid were dissolved, after pulling up, followed by disposing and holding immediately above a liquid level of pyrrole monomer to expose to pyrrole vapor for 60 min, and thereby a chemically polymerized polypyrrole layer as the first conductive polymer layer was formed. Methanol in the solution of an oxidizing agent was added to lower the surface tension of the solution.

Subsequently, to the element, the operation of forming the chemically polymerized polypyrrole layer was repeated once more.

Next, the element was immersed in an aqueous solution (electrolytic polymerization solution) that contains 0.2 mol/L of pyrrole as the polymerizing monomer and 0.06 mol/L of alkyl aromatic sulfonate as the supporting electrolyte, followed by energizing the solution to electrolytically polymerize the pyrrole, and thereby an electrolytically polymerized polypyrrole layer as the second conductive polymer layer was formed on the chemically polymerized polypyrrole layer.

Thereafter, according to the known technology, the cathode drawing out layer made of a conductive carbon layer and a silver paste layer and the encapsulating resin layer made of an epoxy resin were sequentially formed followed by applying the aging, and thereby a capacitor was completed. The electric characteristics of the capacitor are shown in Table 1.

TABLE 1

| | |
|---|---|
| Electrostatic capacitance | 102 μF |
| | (capacitance occurrence rate: 91%) |
| ESR (at 20 degree centigrade) | 79 mΩ (at 100 kHz) |
| | 72 mΩ (at 1 MHz) |
| ESR (at −55 degree centigrade) | 94 mΩ (at 100 kHz) |
| | 78 mΩ (at 1 MHz) |
| LC (Leakage Current) | 23 μA (at 20 degree centigrade) |
| | 48 μA (at 105 degree centigrade) |
| Bias characteristics | $C_0/C_{1.5} - 1 = +0.7\%$ |
| | $C_{10}/C_{1.5} - 1 = -1.7\%$ |
| Thermal load characteristics (240 degree centigrade, after 5 sec) | Capacitance change rate: +7% |
| | LC (at 20 degree centigrade): 70 μA |

In table 1, the ESR denotes the equivalent series resistance measured at the respective temperatures and frequencies each of which is set forth in the table; the LC, the leakage current 5 min after the application of a direct current voltage of 10 V; and the bias characteristics, with the electrostatic capacitance measured by superposing a direct current bias voltage of 1.5 V on an alternating current voltage of 120 Hz and 0.5 V as a basis, a change rate from the basis when a bias voltage of 0 V or 10 V is superposed.

The characteristics shown in Table 1 are in all items in the substantially equal levels with that of a commercially available tantalum anode/conductive polymer cathode capacitor; that is, the disadvantages of a heretofore reported niobium anode/conductive polymer cathode capacitor (presentations at Denkai Chikudenki Kenkyukai on Oct. 12, 2000 and Jul. 12, 2001) are overcome.

[Embodiment 2]

Except that in the step of forming the second conductive polymer layer, an electrolytic polymerization solution in which 0.7 mol of 3,4-ethylene dioxythiophene as a polymerizing monomer and 0.28 mol of alkyl aromatic sulfonate as a supporting electrolyte were dissolved in 820 g of isopropanol was used, under the conditions the same as that of embodiment 1, a capacitor was manufactured.

The electrostatic capacitance of the capacitor was 98 μF. (the capacitance occurrence rate: 88%) and the LC was 9 μA.

Thus, when the chemically polymerized polypyrrole layer as the first conductive polymer layer is formed under the similar conditions as that in embodiment 1, even in the case of the second conductive polymer layer being formed according to the electrolytic polymerization of a thiophene derivative, a niobium anode/conductive polymer cathode capacitor that is excellent in the aging properties, small in the leakage current and high in the capacitance occurrence rate can be provided.

[Embodiment 3]

Except that in the step of forming the second conductive polymer layer, an electrolytic polymerization solution in which 0.2 mol of aniline as a polymerizing monomer and 0.1 mol of sulfuric acid as a supporting electrolyte were dissolved in 970 g of water was used, under the conditions the same as that of embodiment 1, a capacitor was manufactured.

The electrostatic capacitance of the capacitor was 58 μF (the capacitance occurrence rate: 52%) and the LC was 27 μA.

Thus, when the chemically polymerized polypyrrole layer as the first conductive polymer layer is formed under the similar conditions as that in embodiment 1, even in the case of the second conductive polymer layer being formed according to the electrolytic polymerization of aniline, a niobium anode/conductive polymer cathode capacitor that is excellent in the aging properties and small in the leakage current can be provided. In this case, the capacitance occurrence rate is slightly low but it is a practically applicable level. Accordingly, when the formation conditions of the layer of electrolytically polymerized aniline are slightly changed, it is expected that the capacitance occurrence rate can be further improved.

[Embodiment 4]

Except that in the step of forming the second conductive polymer layer, an electrolytic polymerization solution in which 0.2 mol of pyrrole as a polymerizing monomer and 0.06 mol of disodium 1, 3-benzenedisulfonate as a supporting electrolyte were dissolved in 970 g of water was used, under the conditions the same as that of embodiment 1, a capacitor was manufactured.

The electrostatic capacitance of the capacitor was 100 μF (the capacitance occurrence rate: 89%), the ESR was 61 mΩ (at 100 kHz) and the LC was 32 μA.

Thus, when the chemically polymerized polypyrrole layer as the first conductive polymer layer is formed under the similar conditions as that in embodiment 1, even when the electrolytically polymerized polypyrrole layer as the second conductive polymer layer is formed under the conditions slightly different from that of embodiment 1, a niobium anode/conductive polymer cathode capacitor that is excellent in the aging properties, small in the leakage current and high in the capacitance occurrence rate can be provided.

[Embodiment 5]

Except that in the step of forming the first conductive polymer layer with a porous anode element that was obtained by sintering 30 mg of niobium powder of which CV product is 80000 μFV/g together with an embedded niobium wire, with an oxidant solution in which 5% by weight of hydrogen peroxide and 0.5% by weight of sulfuric acid were dissolved in a mixed solvent of water: methanol=9:1 (by weight ratio), the number of repetition of the step of forming the first conductive polymer layer was changed, under the conditions similar to embodiment 1, two kinds of capacitors were prepared.

The electric characteristics of the capacitors are shown in Table 2. The electrostatic capacitance in water of the anode element that was used in this embodiment was 62 µF after the dielectrics film layer was formed.

TABLE 2

| | The number of repetition of chemically polymerizing step | Electrostatic capacitance (µF) | Capacitance occurrence rate (%) | LC (µA) |
|---|---|---|---|---|
| Embodiment 4a | 1 | 36 | 58 | 37 |
| Embodiment 4b | 2 | 55 | 89 | 15 |

Thus, in the case of a concentration of the oxidant solution that is used in forming the chemically polymerized polypyrrole layer being slightly lower, when the operation for forming the chemically polymerized polypyrrole layer is repeated, the capacitance occurrence rate is improved and the leakage current can be reduced.

[Embodiment 6]

Except that in the step of forming the first conductive polymer layer, a concentration of hydrogen peroxide in an oxidant solution was changed, under the conditions similar to that in embodiment 1, 7 kinds of capacitors were prepared.

Figure 2:
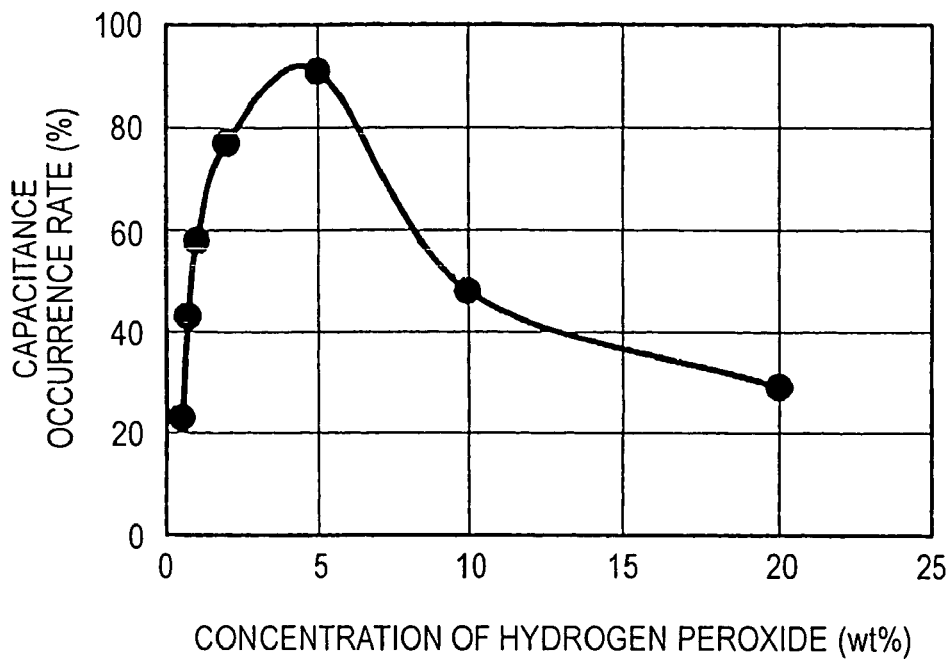
FIG. 2 is a diagram showing experimental results that become basis of the present invention.

The electric characteristics of the capacitors are shown in Table 3 and FIG. 2. The electrostatic capacitance in water of the anode element that was used in this embodiment was 110 µF after the dielectrics film layer was formed.

TABLE 3

| | Concentration of hydrogen peroxide (% by weight) | Electrostatic capacitance (µF) | Capacitance occurrence rate (%) |
|---|---|---|---|
| Comparative embodiment 6a | 0.5 | 25 | 23 |
| Embodiment 6b | 0.7 | 47 | 43 |
| Embodiment 6c | 1 | 64 | 58 |
| Embodiment 6d | 2 | 85 | 77 |
| Embodiment 6e | 5 | 100 | 91 |
| Embodiment 6f | 10 | 53 | 48 |
| Comparative embodiment 6g | 20 | 32 | 29 |

As obvious from Table 3 and FIG. 2, in order to obtain a practically applicable level (substantially 40% or more) of the capacitance occurrence rate, a concentration of hydrogen peroxide in the oxidant solution that is used in forming the chemically polymerized polypyrrole layer is necessary to be in the range of from 0.7 to 10% by weight. Furthermore, in order to obtain a more preferable level (substantially 70% or more) of the capacitance occurrence rate, the concentration of hydrogen peroxide in the oxidant solution that is used in forming the chemically polymerized polypyrrole layer is necessary to be in the range of from 2 to 7% by weight.

In the capacitors according to embodiments 6b through 6f in which the practically applicable levels of the capacitance occurrence rate were attained, the aging could be applied, and values of the leakage currents were similar to that of embodiment 1.

Furthermore, like embodiments 6b through 6d, in the case of the concentration of hydrogen peroxide in the oxidant solution that is used in forming the chemically polymerized polypyrrole layer being slightly low, when the operation of forming the chemically polymerized polypyrrole layer is further repeated, the capacitance occurrence rate is likely to be improved to the level the same as that of embodiment 6e.

[Reference Embodiment 1]

Except that in the step of forming the first conductive polymer layer with a porous anode element that is obtained by sintering 100 mg of niobium powder of which CV product is 46000 µFV/g together with an embedded tantalum wire, an oxidant solution in which 20% by weight of hydrogen peroxide and 1% by weight of sulfuric acid were dissolved in a mixed solvent of water: methanol=9:1 (by weight ratio) was used, under the conditions the same as that of embodiment 1, a capacitor was prepared.

The electrostatic capacitance in water of the anode element that was used in the embodiment was 115 µF after the dielectrics film layer was formed, and the electrostatic capacitance after the completion of the capacitor was 103 µF (the capacitance occurrence rate: 90%).

Thus, in the case of the tantalum anode element being used, even in the case where the concentration of hydrogen peroxide in the oxidant solution that is used in forming the chemically polymerized polypyrrole layer is pretty high (that is, as obvious when referring to comparative embodiment 6g, even under the conditions where in a combination with a niobium anode element a practically applicable capacitance occurrence rate cannot be obtained) excellent capacitance occurrence rate can be obtained.

[Embodiment 7]

Except that in the step of forming the first conductive polymer layer a concentration of sulfuric acid in an oxidant solution was changed, under the conditions similar to that of embodiment 1, 7 kinds of capacitors were prepared.

Figure 3:
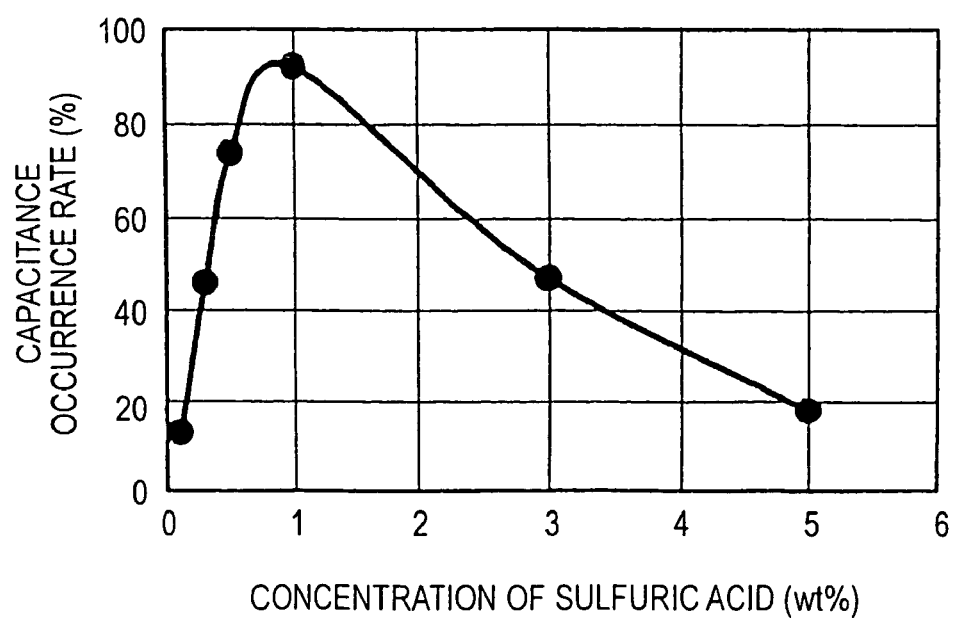
FIG. 3 is a diagram showing experimental results that become basis of the present invention.

The electric characteristics of the capacitors are shown in Table 4 and FIG. 3. The electrostatic capacitance in water of the anode element that was used in this embodiment was 110 µF after the dielectrics film layer was formed.

TABLE 4

| | Concentration of sulfuric acid (% by weight) | Electrostatic capacitance (µF) | Capacitance occurrence rate (%) |
|---|---|---|---|
| Comparative embodiment 7a | 0 | The chemical polymerization did not occur. | |
| Comparative embodiment 7b | 0.1 | 15 | 13 |
| Embodiment 7c | 0.3 | 52 | 46 |
| Embodiment 7d | 0.5 | 83 | 74 |
| Embodiment 7e | 1 | 103 | 92 |
| Embodiment 7f | 3 | 53 | 47 |
| Comparative embodiment 7g | 5 | 20 | 18 |

As obvious from Table 4 and FIG. 3, in order to obtain a practically applicable level (substantially 40% or more) of the capacitance occurrence rate, the concentration of sulfuric acid in the oxidant solution that is used in forming the chemically polymerized polypyrrole layer is necessary to be in the range of from 0.3 to 3% by weight. Furthermore, in order to obtain a more preferable level (substantially 70% or more) of the capacitance occurrence rate, the concentration of sulfuric acid in the oxidant solution that is used in forming the chemically polymerized polypyrrole layer is necessarily in the range of from 0.5 to 2% by weight.

In the capacitors according to embodiments 7c through 7f in which the practically applicable level of the capacitance occurrence rates were attained, the aging could be applied, and values of the leakage currents were similar to that of embodiment 1.

Furthermore, like embodiments 7c and 7d, in the case of the concentration of sulfuric acid in the oxidant solution that is used in forming the chemically polymerized polypyrrole layer being slightly low, when the operation of forming the chemically polymerized polypyrrole layer is further repeated, the capacitance occurrence arte is likely to be improved to the level the same as that of embodiment 7e.

REFERENCE EXAMPLE 2

Except that in the step of forming the first conductive polymer layer an oxidant solution in which 2.3% or 10% by weight of ammonium persulfate and 2.8% by weight of disodium m-benzenesulfonate were dissolved in water was used, under the conditions the same as that of embodiment 1, 2 kinds of capacitors were prepared.

The electrical characteristics of the capacitors are shown in Table 5.

TABLE 5

| | Concentration of ammonium persulfate (% by weight) | Electrostatic capacitance (µF) | Capacitance occurrence rate (%) | ESR (mΩ) | LC (µA) |
|---|---|---|---|---|---|
| Reference embodiment 2a | 2.3 | 7 | 6 | 84 | 50 |
| Reference embodiment 2b | 10 | 14 | 12 | 73 | 30 |

Thus, even when the first conductive polymer layer is formed of chemically polymerized polypyrrole, when the formation conditions thereof (components of the oxidant solution in this case) deviate from the technical range of the invention, though the aging can be applied and the leakage current can be reduced, the practically applicable level of the capacitance occurrence rate cannot be obtained.

REFERENCE EXAMPLE 3

Except that in the step of forming the first conductive polymer, a solution in which 10 g of 3, 4-ethylenedioxythiophene and 16 g of ferric para-toluene sulfonate were dissolved in 74 g of isopropanol was cooled to 5 degree centigrade, a anode element thereon a dielectrics film layer was formed was immersed in the solution followed, after pulling up, by leaving at 25 degree centigrade for 1 hr, and thereby a chemically polymerized polythiophene derivative layer as the first conductive polymer layer was formed, under the conditions the same as that of embodiment 1, a capacitor was prepared.

The electrostatic capacitance of the capacitor was 85 µF (capacitance occurrence rate: 76%) and the ESR was 75 mΩ; however, as to the leakage current, since it was in an almost short-circuited state, the aging could not be applied.

Thus, when the first conductive polymer layer is formed of a chemically polymerized polythiophene derivative, though a practically applicable level of the capacitance occurrence rate can be obtained, in view of the aging, it cannot be put into practical use.

REFERENCE EXAMPLE 4

Except that in the step of forming the first conductive polymer layer, under the conditions the same as that in reference embodiment 3, the operation of forming the chemically polymerized polythiophene derivative layer was repeated ten times and the operation for forming the second conductive polymer layer was not carried out, under the conditions the same as that in embodiment 1, a capacitor was prepared.

The electrostatic capacitance of the capacitor was 50 µF (capacitance occurrence rate: 45%) and the ESR was 800 mΩ; however, as to the leakage current, since it was in an almost short-circuited state, the aging could not be applied.

Similarly to the case of reference embodiment 3, when a conductive polymer layer that is formed immediately above the dielectrics film layer is formed of a chemically polymerized polythiophene derivative, in view of the aging, it cannot be put into practical use.

REFERENCE EXAMPLE 5

Except that in the step of forming the first conductive polymer, in an aqueous solution of 23% by weight of ammonium persulfate a anode element thereon a dielectrics film layer was formed was immersed, after pulling up, it was immersed in an aqueous solution of 7.2% by weight of aniline sulfate for 30 or 60 min, and thereby a chemically polymerized polyaniline layer was formed, under the conditions the same as that of embodiment 1, 2 kinds of capacitors were prepared.

The electrostatic capacitance of the capacitor was 6.7 µF (capacitance occurrence rate: 6%) when an immersion time in aniline sulfate solution in the step of forming the chemically polymerized polyaniline layer was 30 min, and 8.7 µF (capacitance occurrence rate: 8%) when it was 60 min.

Thus, when the first conductive polymer layer is formed of chemically polymerized polyaniline, a practically applicable level of the capacitance occurrence rate cannot be obtained.

REFERENCE EXAMPLE 6

Except that the operation of forming a chemically polymerized polypyrrole layer as the first conductive polymer layer was repeated 5 times and an electrolytically polymerized conductive polymer layer as the second conductive polymer layer was not formed, under the conditions the same as that in embodiment 1, a capacitor was prepared.

The electrostatic capacitance of the capacitor was 1 µF (capacitance occurrence rate: 0.9%) and the leakage current was 2 µA.

Thus, when the chemically polymerized polypyrrole layer is formed immediately above a dielectrics film layer, the aging can be applied and the leakage current can be reduced; however, the lamination of the chemically polymerized polypyrrole layer alone, when an electrolytically polymerized conductive polymer layer is not formed thereon, cannot give the practically applicable level of the capacitance occurrence rate.

Each of methods of forming the conductive polymer layers shown in the above reference embodiments 2 through 5, when applied in combination with a tantalum anode element to manufacture a capacitor, exhibits reasonable level of performance; however, in the case of it being combined with a niobium anode element to manufacture a capacitor, the conductive polymer layer cannot be formed to the center portion of the element to result in very low in the capacitance occurrence rate, the aging cannot be forwarded owing to the short circuit and so on. That is, fundamental requirements as a capacitor are not satisfied in many cases. Accordingly, it suggests that the present inventive technology of the niobium anode/conductive polymer cathode capacitor cannot be easily thought of from the conventional technologies of a tantalum anode/conductive polymer cathode capacitor.

As mentioned above, according to the invention, in a solid electrolytic capacitor in which a niobium anode and a conductive polymer cathode are combined, a practically applicable level of the capacitance occurrence rate and the reduction of the leakage current by means of the aging can be combined.

That is, according to the invention, while taking out the advantage of a niobium anode body that the CV product per unit mass can be easily made larger than that of the tantalum anode body, problems of conventional niobium electrolytic capacitors in that the aging properties are poor, the leakage current is large and deteriorates owing to heat, the electrostatic capacitance depends on the bias voltage and so on are simultaneously solved. Accordingly, a niobium anode/conductive polymer cathode capacitor that is comparable with a tantalum anode/conductive polymer cathode capacitor in the electrostatic capacitance per unit mass and performance can be put into practical use. As a result, even in view of the cost and global resources, it has a very large impact on the electronics industry.

The invention claimed is:

1. A method of manufacturing a solid electrolytic capacitor, in a method of manufacturing a solid electrolytic capacitor in which on a surface of a anode body that is made of niobium or an alloy primarily made of niobium, a dielectrics film layer, a first conductive polymer layer and a second conductive polymer layer are sequentially formed, comprising:

a step of forming, on the dielectrics film layer, a first conductive polymer layer made of polypyrrole or a polypyrrole derivative by immersing a anode body on which the dielectrics film layer is formed in a solution that includes from 0.7 to 10% by weight of hydrogen peroxide, from 0.3 to 3% by weight of sulfuric acid and water as a main solvent, followed by, after pulling up, exposing to vapor of pyrrole or a pyrrole derivative; and a step of forming a second conductive polymer layer on the first conductive polymer layer by immersing the anode body on which the dielectrics film layer and the first conductive polymer layer are formed in a solution that includes a polymerizing monomer and a supporting electrolyte, followed by energizing the solution to electrolytically polymerize the polymerizing monomer.

2. A method of manufacturing a solid electrolytic capacitor as set forth in claim 1, wherein the anode body on which the dielectrics film layer is formed is immersed in a solution that includes from 2 to 7% by weight of hydrogen peroxide, from 0.5 to 2% by weight of sulfuric acid and water as a main solvent, followed by, after pulling up, exposing to vapor of pyrrole or a pyrrole derivative, and thereby a first conductive polymer layer is formed.

3. A method of manufacturing a solid electrolytic capacitor as set forth in claim 1, wherein the anode body on which the dielectrics film layer is formed is immersed in a solution that includes hydrogen peroxide, sulfuric acid, water and a water-soluble organic solvent, followed by, after pulling up, exposing to vapor of pyrrole or a pyrrole derivative, and thereby a first conductive polymer layer is formed.

4. A method of manufacturing a solid electrolytic capacitor as set forth in claim 1, wherein prior to forming the second conductive polymer layer, a step of forming the first conductive polymer layer is repeated a plurality of times.

5. A method of manufacturing a solid electrolytic capacitor as set forth in claim 1, wherein the dielectrics film layer is formed by immersing the anode body in a solution that includes an acid or a salt thereof and water as a main solvent to apply a chemical conversion (anodic oxidation) process;

wherein a temperature of the solution in the chemical conversion step is set at a solidifying point of the solution or more and substantially 40 degree centigrade or less.

* * * * *